Aug. 15, 1961     T. HAFNER     2,996,691
SUSPENSION MECHANISM FOR SURFACE WAVE TRANSMISSION LINE
Filed Oct. 20, 1958

INVENTOR.
THEODORE HAFNER

United States Patent Office 2,996,691
Patented Aug. 15, 1961

2,996,691
SUSPENSION MECHANISM FOR SURFACE
WAVE TRANSMISSION LINE
Theodore Hafner, 1501 Broadway, New York 36, N.Y.
Filed Oct. 20, 1958, Ser. No. 768,157
6 Claims. (Cl. 333—95)

This invention relates to suspension mechanisms for surface wave transmission lines and more specifically to a relatively rigid pole suspension.

One of the objects of the invention is a suspension for a surface wave transmission line, of relatively rigid structure easily mountable or demountable, but of minimum resistance to the surface wave propagated along the line.

Another object of the invention is to provide around the surface wave conductor at the suspension point one or several spirals of insulating rod, tube or filament of a cross section which is small against operating wave length and preferably smaller than the cross section of the entire surface wave conductor, at a lay which is also small against operating wave lengths.

Another object of the invention is to suspend the surface wave conductor on an extension of the spiral or spirals of a length of wave length dimension or a dimension corresponding to the field radius or the field of high field strength of the surface wave conductor.

A further object of the invention is to make the spiral or spirals of gradually decreasing cross section from the point of suspension to the free end.

A further object of the invention is to reinforce the extension supporting the spiral or spirals, preferably beginning from a point outside the field radius or the field of high field strength intensity.

Still another object of the invention is to provide a flat spiral or spirals consisting of tape or of a flat array of several smaller filaments, spirally wound around the surface wave conductor flat-lying thereagainst, and preferably also of a lay which is small against operating wave length and if desired also of gradually diminishing cross section towards the free end or ends of the spiral or spirals.

Still further an object of the invention is to extend such a tape structure into the surface wave field with its plane substantially parallel to the direction of the propagation of the surface wave; the pole suspension itself being formed at a point outside the field radius or of relatively low field strength by twisting the tape by 90° to permit the formation of a loop around the pole arm.

Figure 1:
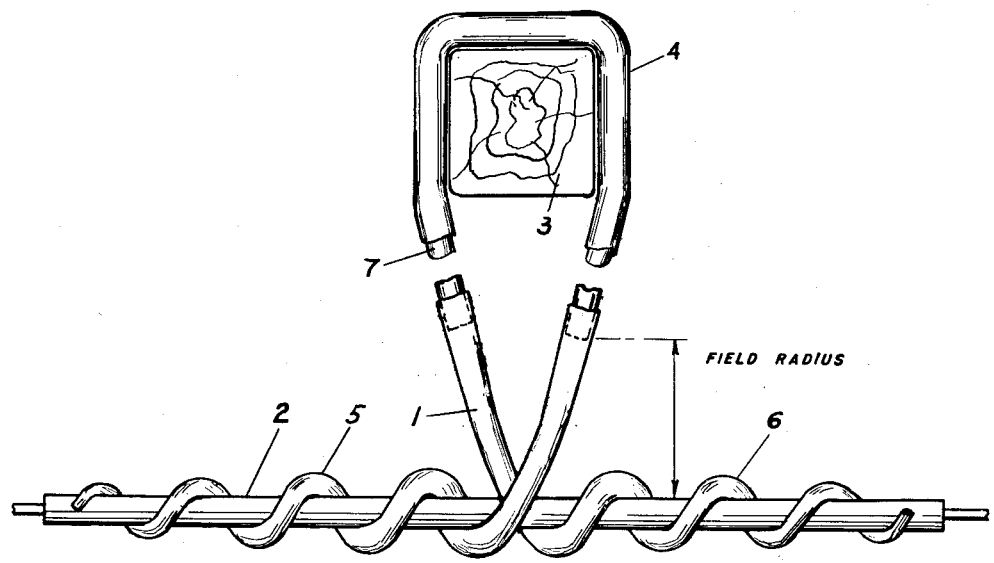

These and other objects of the invention will be more fully apparent from the drawing annexed herewith in which FIG. 1 represents a suspension of a surface wave conductor embodying certain features of the invention.

Figure 2:
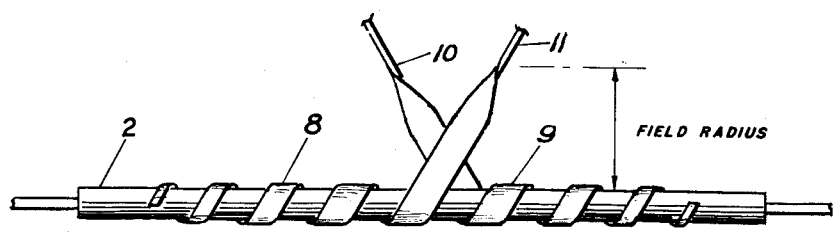
Figure 3:
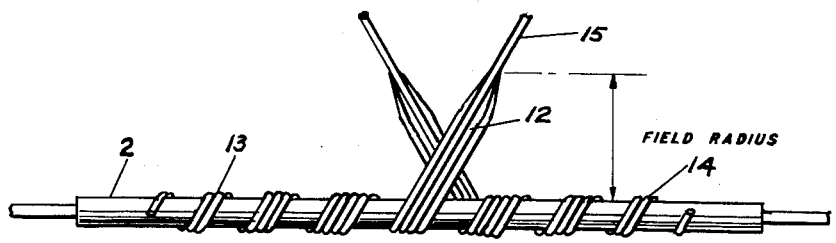

FIGS. 2 and 3 represent modifications of FIG. 1.

In FIG. 1 a filament 1 consisting of polyethylene or other dielectric of relatively low loss, such as .001 at 150–250 mc., supports surface wave conductor 2 on a pole arm 3 in a loop 4 arranged at a predetermined distance depending upon the field radius of surface wave conductor 2 and usually of wave length dimension, for example half a wave length.

Loop 4 extends at the suspension point of surface wave conductor 2 in two oppositely wound spirals 5, 6. The entire length of each spiral 5, 6 is generally of the order of wave length dimension and the lay of the spiral preferably small against operating wave length.

The diameter of filament 1 is also generally made small against wave length dimension and preferably of the order of not more than the diameter of the surface wave conductor 2, and preferably at the spirals 5, 6 smaller than about half the diameter of surface wave conductor 2, and smaller than at loop 4.

In order further to reduce loss of surface wave energy, in accordance with the invention, the diameter of the filament of spirals 5 and 6 is gradually diminished at least from the point of start of the spirals to their free ends.

Furthermore, if desired loop 4 surrounding pole 3 may be reinforced with Fiberglas insert 7 extending toward the field of maximum field concentration but remaining if possible outside thereof, or, if not, separated by a space of high field strength from surface wave conductor 2 itself.

According to FIG. 2 the supporting spirals 8, 9 for surface wave conductor 2 are in the form of a tape lying flat against surface wave conductor 2 with a lay which is small against operating wave length and also of gradually diminishing width toward the free ends.

In order to reduce surface wave resistance up to a point determined by the field radius or the dimension of the field of high field concentration, the tape arranged in a plane which is substantially parallel to the direction of the propagation of the surface wave, and beyond this distance at points 10, 11, the tape is twisted around by 90° to form a loop adapted to be wound around a pole arm or other supporting structure (not shown) in a manner similar to that shown in FIG. 1, or in any other vertical or horizontal suspension.

At the pole or mast suspension, if necessary, the tape may be reinforced with inserts or attachments in a manner analog to that shown in FIG. 1.

FIG. 3 shows a tape-like supporting structure consisting of a number of low loss dielectric filaments 12 extending into spirals 13, 14 and supporting surface wave conductor 2 in a manner similar to that shown in FIG. 2. In this case, however, reduction in the width of spirals 12, 13 along the surface wave conductor 2 can be simply effected by reducing or cutting off corresponding lengths of some of the filaments 11.

The invention is not limited to the particular material, shape, extent and structure of the suspensions shown and described but may be applied in any form or manner whatsoever without departing from the scope of this disclosure as claimed herein.

I claim:

1. In a suspension mechanism for surface wave transmission lines on pole installations operating over a predetermined wave length range, a rigid loop of low loss insulating material of a cross-section which is small against operating wave length adapted to surround a pole arm and rigidly extending therefrom downward over a predeterminedly fixed distance corresponding to the field radius of said surface wave transmission line, said loop being substantially untwisted so as to be permitted to be spread apart in a direction substantially perpendicular to its plane, a surface wave conductor supported on the end of said loop by having wound spirally around it in one direction an extension of one end of said loop beyond its crossing point with the other end of said loop, an extension of the other end of said loop being spirally wound around a portion of the surface wave transmission line from a crossing point of said other loop end with the first end of said loop; the spiral windings having a lay which is small against operating wave length and extending over a distance along said surface wave transmission line to both sides of said loop which is of the order of said operating wave length, and said loop and said spiral extensions of said loop being formed of a single piece of rod of said insulating material.

2. Mechanism according to claim 1 wherein the thickness of said loop and spirals are substantially the same and small against operating wave length.

3. Mechanism according to claim 1 wherein the thickness of said spirals is gradually reduced toward the end of each spiral.

4. Mechanism according to claim 1 wherein said spirals are of oval shape with their flat portions surrounding said surface wave transmission line and gradually reduced in cross section toward the end of said spirals.

5. Mechanism according to claim 1 wherein said loop is of oval shape lying flat against said pole or at least for a portion surrounding said pole arm, another portion beginning from said crossing point at the end of said loop and extending upward toward said pole arm being twisted by 180° with respect to said pole arm so as to reduce wave resistance to a minimum.

6. Mechanism according to claim 1 wherein said loop for at least a portion surrounding said pole arm consists of low-loss polyethylene having Fiberglas inserts.

References Cited in the file of this patent

UNITED STATES PATENTS

| | | |
|---|---|---|
| 413,707 | Campbell | Oct. 29, 1889 |
| 1,725,610 | Byl | Aug. 20, 1929 |
| 2,172,810 | Sherman | Sept. 12, 1939 |
| 2,275,019 | Peterson | Mar. 3, 1942 |
| 2,915,891 | Vealey | Dec. 8, 1959 |

OTHER REFERENCES

"Loss Measurements of Surface Wave Transmission Lines," by Scheibe et al., Journal of Applied Physics, vol. 25, No. 6, June 1954, pages 790–797.

Advertising circular, "A VHF Community G-Line," by Surface Conduction Inc., 521 Fifth Ave., New York 17, N.Y.